US012160637B2

(12) United States Patent
Manohar (10) Patent No.: US 12,160,637 B2
(45) Date of Patent: Dec. 3, 2024

(54) PLAYING MEDIA CONTENTS BASED ON METADATA INDICATING CONTENT CATEGORIES

(71) Applicant: ROKU, INC., San Jose, CA (US)

(72) Inventor: Bollapragada Manohar, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/115,951

(22) Filed: Mar. 1, 2023

(65) Prior Publication Data

US 2024/0298071 A1 Sep. 5, 2024

(51) Int. Cl.
*H04N 21/454* (2011.01)
*H04N 21/45* (2011.01)
*H04N 21/84* (2011.01)

(52) U.S. Cl.
CPC ..... *H04N 21/4542* (2013.01); *H04N 21/4532* (2013.01); *H04N 21/84* (2013.01)

(58) Field of Classification Search
CPC ........... H04N 21/4542; H04N 21/4532; H04N 21/84; H04L 29/08
See application file for complete search history.

(56) References Cited

U.S. PATENT DOCUMENTS 10,757,216 B1 * 8/2020 Van Vliet ................ H04L 29/08
2014/0338001 A1 11/2014 Zhang et al.
2019/0373322 A1 12/2019 Rojas-Echenique et al.
2020/0169787 A1 * 5/2020 Pearce ............... H04N 21/4542
2022/0058215 A1 2/2022 Johnson et al.
2022/0312075 A1 * 9/2022 Dhiman ............ H04N 21/4542

FOREIGN PATENT DOCUMENTS

EP 2533548 A1 12/2012

OTHER PUBLICATIONS

European Patent Office, "Extended European Search Report," directed to EP application No. 24160303.4, Jun. 24, 2024, 7 pages.

* cited by examiner

*Primary Examiner* — Anthony Bantamoi
(74) *Attorney, Agent, or Firm* — Sterne, Kessler, Goldstein & Fox P.L.L.C.

(57) ABSTRACT

User information can be determined based on a user input received from a user, a user profile about the user, and a profile of a user community including the user. Metadata associated with a media content can indicate a first portion of the media content to be of a first content category, and a second portion of the media content to be of a second content category different from the first content category. The media content can include an audio stream and a video stream, and the first content category or the second content category can be determined based on the audio stream or the video stream of the media content. Based on the metadata and the user information, a first action can be performed for playing the first portion of the media content and a second action can be performed for playing the second portion of the media content.

20 Claims, 5 Drawing Sheets

PLAYING MEDIA CONTENTS BASED ON METADATA INDICATING CONTENT CATEGORIES

BACKGROUND

Field

This disclosure is generally directed to playing media contents in a multimedia environment including playing media contents based on metadata indicating content categories.

Background

Television (TV) or other media devices can offer viewers access to content, or media content, which may be TV content, film, movies, or other multimedia content, via subscription to cable, satellite services, through over-the-air broadcasts, or other means. In general, media content can be delivered from a content source device operated by a content provider to millions of viewers to be displayed by TV devices or display devices. With an increasing number of TV channels and programs coming into viewers' homes, it is important to select the right media content for viewing. For example, parents may monitor what content their children are watching. Many parents are concerned about their young children watching programs with content that's more suitable for older children or adults. To select the right content, the television industry has designed a TV ratings system to give parents more information about the content and age-appropriateness of TV programs. These ratings, called the TV parental guidelines, are modeled after the familiar movie ratings, which parents have known and valued for decades. Both movie ratings and TV ratings system are examples of content categories corresponding to media content. How to effectively control the display of media content to the right audience can be a challenge.

SUMMARY

Provided herein are system, apparatus, article of manufacture, method and/or computer program product embodiments, and/or combinations and sub-combinations thereof, for playing media contents based on metadata indicating content categories. Instead of having one TV program rating or movie rating for an entire media content such as a TV program or a movie, a media content can have multiple content categories assigned to different portions of the media content. The multiple content categories may be indicated by metadata, and different actions may be performed for the corresponding portions of the media content based on the content categories indicated by the metadata.

In some embodiments, a method for playing a media content can include determining user information based on a user input received from a user, a stored user profile about the user, and a profile of a user community including the user; and further determining metadata associated with the media content to indicate a first portion of the media content to be of a first content category, and a second portion of the media content to be of a second content category different from the first content category. The media content can include an audio stream and a video stream, and the first content category or the second content category can be determined based on the audio stream or the video stream of the media content. Furthermore, the method can include determining, based on the metadata and the user information, a first action to be performed for playing the first portion of the media content and a second action to be performed for playing the second portion of the media content.

In some embodiments, the method can further include playing the media content on a user device by performing the first action for the first portion of the media content, and performing the second action for the second portion of the media content. In some embodiments, the performing the first action for the first portion of the media content can include playing the video stream without playing at least a part of the audio stream, or playing the audio stream without playing at least a part of the video stream.

In some embodiments, the media content can include a sequence of frames, the first portion of the media content can include a first frame, and the second portion of the media content can include a second frame immediately adjacent to the first frame in the sequence of frames. In some embodiments, the profile of the user community can include data collected about actions performed by other users of the user community when the media content is played to the other users, and the metadata includes information generated by machine learning based on the collected data included in the profile of the user community.

In some embodiments, the user profile can include data collected about the user based on users' action when playing other media content, and the determining the first action and the second action includes determining the first action and the second action based on the metadata and the data collected about the user based on users' action when playing other media content.

In some embodiments, the user input can include an objected language the user prefers not to hear, and the determining the first action includes removing the objected language from the audio stream when playing the first portion of the media content, and the determining the second action includes removing the objected language from the audio stream when playing the second portion of the media content. In some embodiments, the user input can include a user preferred content rating, and the determining the first action includes muting the audio stream or playing a blank frame of the video stream when playing the first portion of the media content and the first content category is not compatible with the user preferred content rating.

In some embodiments, the first content category or the second content category can indicate a content rating selected from general audiences (G) rating, a parental guidance (PG) rating, a PG-13 rating, a restricted (R) rating, or a X rating not suitable for anyone under 17. In some embodiments, the first content category or the second content category can include an indication related to abusive language in the audio stream, violent language in the audio stream, a sexual scene in the video stream, or a graphic scene in the video stream.

In some embodiments, the determining the metadata associated with the media content can include receiving the media content from a content provider, and generating the metadata associated with the media content after the media content has been received. In some embodiments, the metadata can include a first record having the first content category, and a first time period with a first starting time and a first ending time indicating a duration of the first portion of the media content, and a second record having the second content category, and a second time period with a second starting time and a second ending time indicating a duration of the second portion of the media content. In some embodiments, the media content can have a received metadata including an indication of a third content category when the media content is received, where the third content category is different from the first content category, and the first record is generated by modifying the third content category to become the first content category.

In some embodiments, the determining the metadata associated with the media content can include determining the metadata associated with the media content by a cloud server, the determine the user information can include determining the user information based on the user input received from the user by a user device, and the determining the first action and the second action can include determining the first action and the second action by the cloud server.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for playing media contents based on metadata indicating content categories.

Media content, or simply content or a content item, such as TV content, film, movies, or other multimedia content, can have a content rating assigned to the entire media content based on some industry standards, such as the parental guidance rating for TV contents, or the movie ratings for movies. However, a content rating, such as a parental guidance rating assigned to a media content, may not necessarily be applicable to the entire media content. For example, for a 90-minutes movie having a R or PG-13 rating, there may be a 20-minutes segment containing R rated pictures or language, while the rest 70-minutes of the movie may have PG rating and be very well suitable to the whole family viewing including children. If mechanisms can be provided to modify the media content to skip or hide the 20-minutes R rated segment, the rest of the 70-minutes may be able to be shown to the family including children. Accordingly, content rating assigned to an entire media content may lead to an undesirable consequence that a family may not be able to watch a movie with a large portion of the media content suitable for the family.

Embodiments herein provide a mechanism for playing media contents based on metadata indicating content categories. A content rating is a content category. Instead of assigning one content category for the entire media content, metadata can be generated for the media content, where the metadata can include multiple content categories for different portions of the media content. Accordingly, the media content can be played in different ways corresponding to the metadata Different portions of the media content can have corresponding metadata indicating the content categories, and different actions may be performed for the corresponding portions of the media content based on the content categories indicated by the metadata. Therefore, a user may be able to selectively play a portion of a movie based on the content category assigned to the portion of the movie, instead of a content rating assigned to the entire movie. In addition, metadata can also give the user the ability to decide how to play (muted audio, muted video or skip etc.) the portions of the media content that is not suitable to be displayed entirely. Accordingly, embodiments herein can have the added advantage to content generators and media distributors so that they can target more audience. In addition, embodiments herein can be applicable to media content platforms with a large number of users to create metadata for generating the multiple content categories based on the input from various users.

Figure 1:
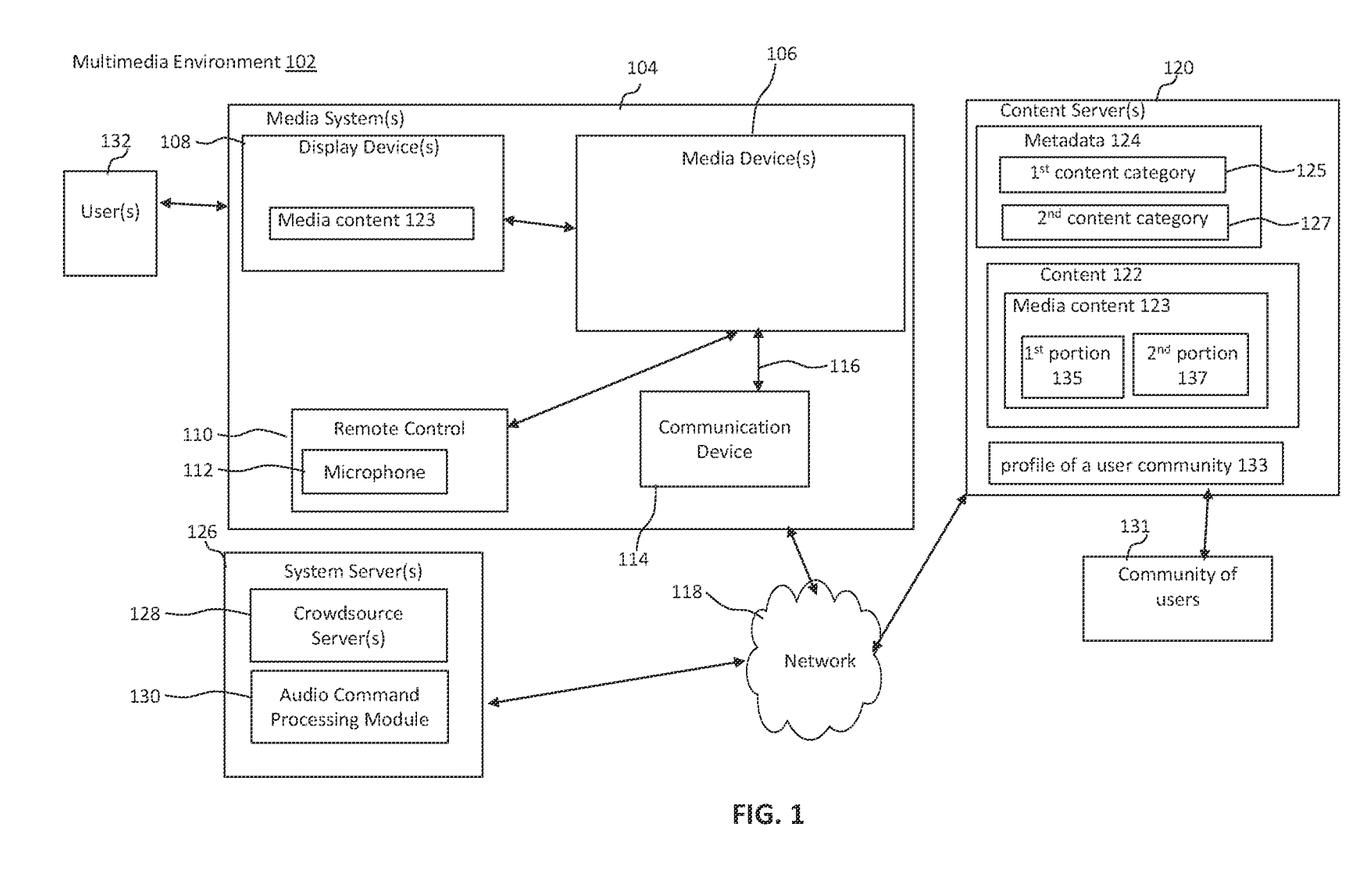
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. Users 132 may operate with the media system 104 to select and consume content, such as media content 123, which may also be referred to as a content item. User 132 may be a part of a community of users 131.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include multiple content items, such as media content 123, which may be any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122 or media content 123. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some embodiments, content server 120 may also store information about the community of users 131, which can include user(s) 132. The community of users 131 may share a profile of user community 133. In some embodiments, content server 120 and media device 106 may work together to play media content 123 based on metadata 124 indicating content categories, such as a first content category 125 corresponding to a first portion 135 and a second content category 127 corresponding to a second portion 137 of media content 123. Accordingly, instead of having a single movie ratings assigned to an entire movie, or a parental guidance rating assigned to an entire TV program, media content 123 may be a movie or a TV program including multiple portions, e.g., the first portion 135 and the second portion 137, assigned as multiple different content categories, e.g., the first content category 125 and the second content category 127 different from the first content category 125. The first content category 125 and the second content category 127 are included in metadata 124.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
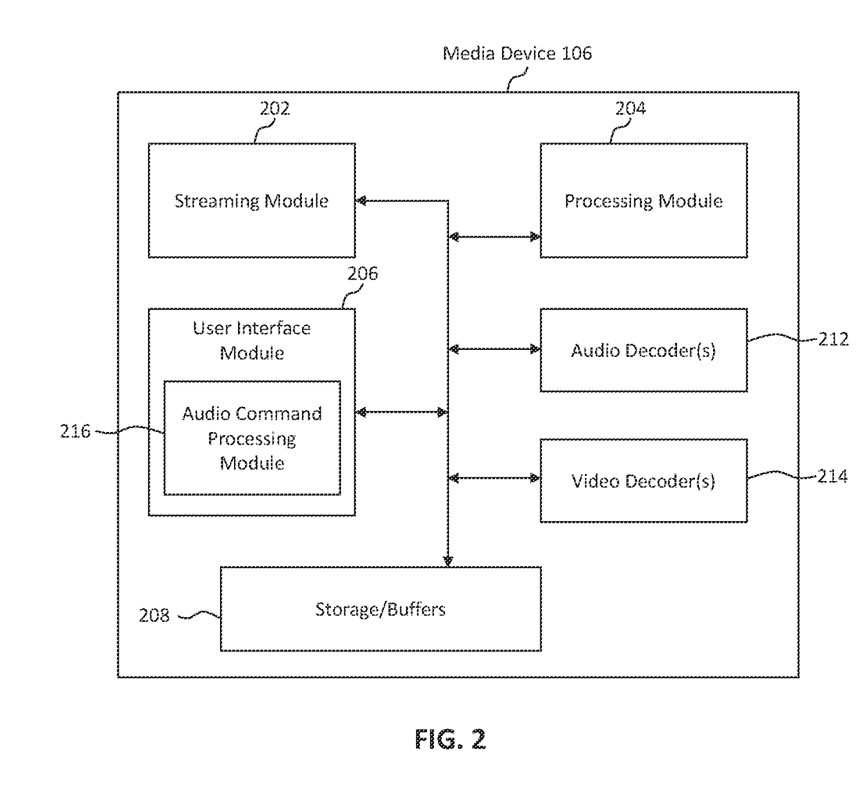
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206.

As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, H.265, AV1, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Figure 3:
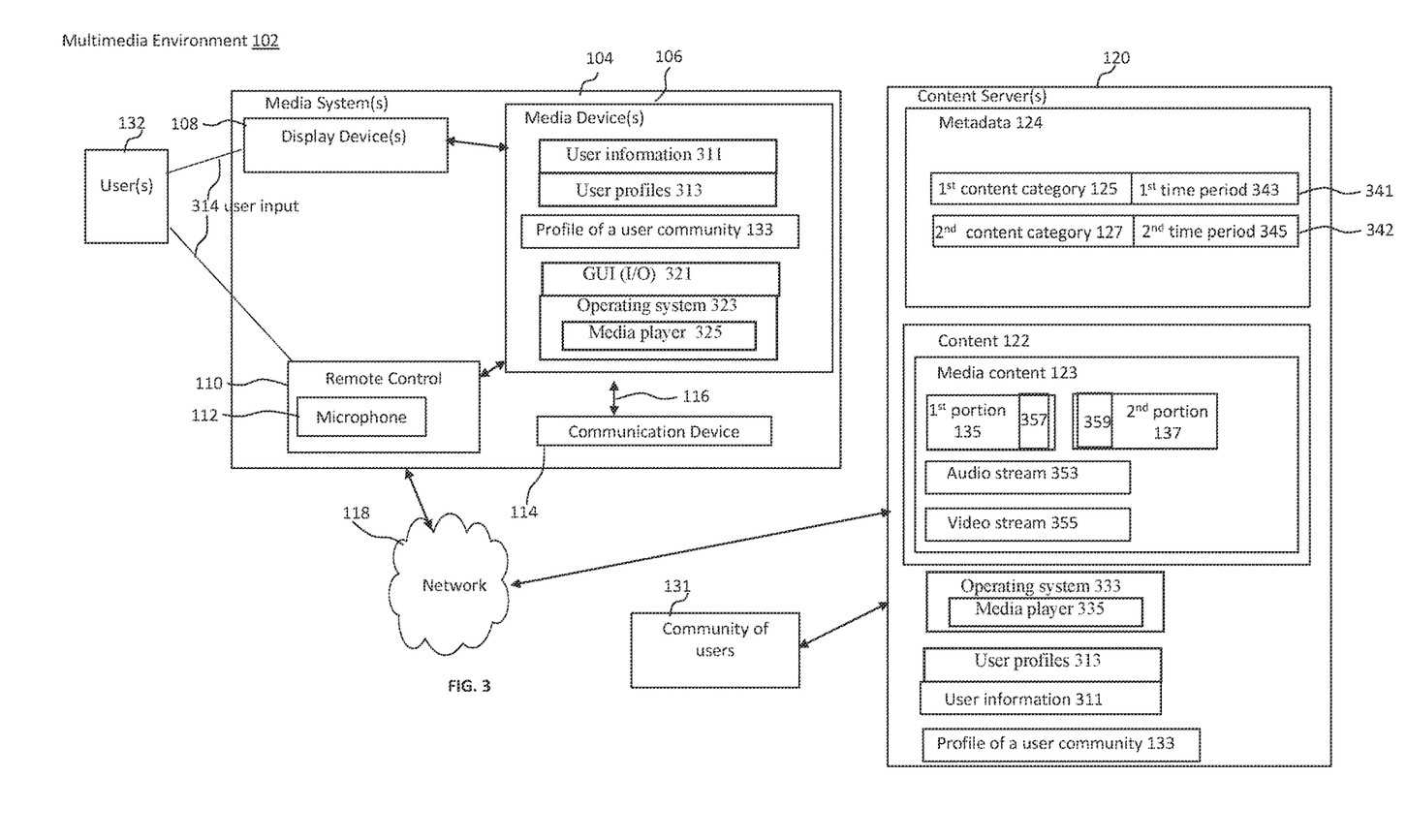
FIG. 3 is a block diagram illustrating a multimedia environment for playing media contents based on metadata indicating content categories, according to some example embodiments.

FIG. 3 is a block diagram illustrating multimedia environment 102 for playing media contents based on metadata indicating content categories, according to some example embodiments. For example, content server 120 and media device 106 may work together to play media content 123 based on metadata 124 indicating multiple content categories, such as the first content category 125 corresponding to the first portion 135 and the second content category 127 corresponding to the second portion 137 of media content 123.

In some embodiments, media content 123 may include multimedia, such as television shows, books, video games, movies, music, music videos, lectures, pictures, images, and/or art that may be selected for consumption by a user. In other embodiments, media content 123 may include any type of data files.

In some embodiments, media content 123 can include a sequence of frames, which can be divided into multiple portions of frames, such as the first portion 135 and the second portion 137. The first portion 135 can include a first frame 357 as its last frame, and the second portion 137 can include a second frame 359 as its first frame, where the second frame 359 can be immediately adjacent to the first frame 357 in the sequence of frames.

In some embodiments, media content 123 can include an audio stream 353 and a video stream 355. In some embodiments, audio stream 353 can also include a portion corresponding to the first portion 135 and a portion corresponding to the second portion 137. Similarly, video stream 355 can include a portion corresponding to the first portion 135 and a portion corresponding to the second portion 137. Each frame of the sequence of frames for media content 123 can have its own corresponding audio stream content included in audio stream 353 and video stream content included in video stream 355.

In some embodiments, metadata 124 can be associated with media content 123 to indicate the first portion 135 of media content 123 to be of the first content category 125, and the second portion 137 of the media content 123 to be of the second content category 127 different from the first content category 125. The first content category 125 or the second content category 127 can be determined based on audio stream 353 or video stream 355 of media content 123. Accordingly, different from the conventional content rating applied to the entire content of media content 123, the first content category 125 and the second content category 127 can provide more detailed description of the content of media content 123, leading to more flexible actions to be performed when playing media content 123.

In some embodiments, the first content category 125 or the second content category 127 can indicate a content rating selected from general audiences (G) rating, a parental guidance (PG) rating, a PG-13 rating, a restricted (R) rating, or a X rating not suitable for anyone under 17, an all children rating, a directed to older children rating, a general audience rating, a parental guidance suggested rating, a parents strongly cautioned rating, a mature audience only rating, any other media genre type that may be used in practice, or any other scene of user defined genre not covered by standard scenarios. In some embodiments, the first content category 125 or the second content category 127 can include an indication related to abusive language in audio stream 353, violent language in audio stream 353, a sexual scene in video stream 355, a graphic scene in video stream 355, or any other content category supported by content server 120 and media device 106.

In some embodiments, the first content category 125 can be included in a first record 341 having the first content category 125, and a first time period 343, and the second content category 127 can be included in a second record 342 having the second content category 127, and a second time period 345. Both the first record 341 and the second record 342 are part of metadata 124. In some embodiments, the first time period 343 can include a first starting time and a first ending time indicating a duration of the first portion 135 of media content 123, and the second time period 345 can include a second starting time and a second ending time indicating a duration of the second portion 137 of media content 123.

| Content category (rating) | Time period |
| --- | --- |
| PG | 00:00-00:27 |
| PG-13 | 00:27-00:32 |
| G | 00:32-01:01 |

In some embodiments, exemplary records of the first record 341 and the second record 342 can be found in Table above. As shown in above Table, a first record indicates a first portion of a media content having a content category rated as PG during the time duration of starting time 00:00 and ending time 00:27, a second record indicates a second portion of the media content having a content category rated as PG-13 during the time duration of starting time 00:27 and ending time 00:32, and a third record indicates a third portion of the media content having a content category rated as G during the time duration of starting time 00:32 and ending time 01:01. Therefore, for the one single media content, three different portions are assigned to three different content categories. If the media content is shown to someone not suitable to view PG-13 content, the first portion having the content category PG and the third portion having the content category G can still be shown without any objections, while the second portion may not be shown. Accordingly, records including different content categories included in metadata can help to show a media content to a wider audience by not showing a portion of the media content to the audience.

In some embodiments, user 132 may operate media device 106 to watch or consume media content 123, using remote control 110. Media device 106 may include any device that allows user 132 to stream, purchase, rent, or download media content 123. In some embodiments, media device 106 may be connected (wired or wirelessly) to display device 108, such as a monitor or television. In some embodiments, media device 106 may be integrated into display device 108 (or vice versa), as a single device, such as a SMART television, laptop/tablet computer, or Internet of Things (IoT) device with one or more streaming media services through which user 132 may select and consume various media content 123. In some embodiments, media device 106 may include an app on a mobile phone, tablet, or laptop (e.g., display device 108—which may include a keyboard or interface that is used as remote control 110) which user 132 may use to watch media content 123. In some embodiments, media device 106 can include a media player 325 to play media content 123, where media player 325 can be a part of an operating system 323 of media device 106. User 132 may interact with media device 106 through a graphical user interface (GUI) 321 to interact and control media device 106. Similarly, content server 120 can include a media player 335 to play media content 123, where media player 335 can be a part of an operating system 333 of content server 120.

In some embodiments, a user input 314 can be received from user 132 through display device 108, remote control 110, an input device attached to media device 106, or other input devices. In addition, media device 106 can store a user profile 313 about user 132. In some embodiments, media device 106 can also store profile of the user community 133 for the community of users 131 that includes user 132. Media device 106 can determine user information 311 based on user input 314 received from user 132, user profile 313 about user 132, and profile of the user community 133. In some embodiments, media device 106 can determine user information 311 to reflect more priority for user input 314. When there is no user input 314 received, media device 106 may rely on user profile 313 or profile of the user community 133, where profile of the user community 133 may be received from content server 120. In some embodiments, profile of the user community 133 may not be available on media device 106. There can be many different options to determine user information 311.

In some embodiments, media device 106 can further determine metadata 124 associated with media content 123 as described above, e.g., including the first record 341 and the second record 342. In some embodiments, profile of the user community 133 can include data collected about actions performed by other users of the user community 131 when media content 123 is played to the other users, and metadata 124 includes information generated by machine learning based on the collected data included in the profile of the user community 133.

In some embodiments, some operations may be performed by content server 120 or a combination of content server 120 and media device 106, such as determining user information 311, or determining metadata 124 associated with media content 123. Operations performed by content server 120 or media device 106 may be controlled or aided by operating system 323 or operating system 333, through GUI 321, using media player 325 or media player 335.

In some embodiments, media device 106 can determine, based on metadata 124 and user information 311, a first action to be performed for playing the first portion 135 of media content 123 and a second action to be performed for playing the second portion 137 of media content 123. Accordingly, the first action to be performed for playing the first portion 135 and the second action to be performed for playing the second portion 137 may depend on multiple parameters such as metadata 124, user profile 313, user input 314, and profile of the user community 133. Media device 106 can play media content 123 on a user device by performing the first action for the first portion 135, and performing the second action for the second portion 137. In some embodiments, the performing the first action for the first portion 135 can include playing video stream 355 corresponding to the first portion 135 without playing at least a part of audio stream 353 that corresponds to the first portion 135, or playing audio stream 353 corresponding to the first portion 135 without playing at least a part of video stream 355 corresponding to the first portion 135.

In some embodiments, user profile 313 can include data collected about user 132 based on users' action when playing other media content. Media device 106 can determine the first action and the second action based on metadata 124 and the data collected about user 132 based on users' action when playing other media content.

In some embodiments, user input 314 can include an objected language user 132 prefers not to hear. Accordingly, media device 106 can determine and perform the first action to remove the objected language from audio stream 353 when playing the first portion 135, and determine and perform the second action to remove the objected language from audio stream 353 when playing the second portion 137. In some embodiments, user input 314 can include a user preferred content rating, and media device 106 can determine the first action to mute audio stream 353 or play a blank frame of video stream 355 when playing the first portion 135 and the first content category 125 is not compatible with the user preferred content rating.

In some embodiments, media device 106 can be enhanced to provide an option for user 132 to input his/her preference on content rating or content category and associated action, where the preference may be provided through GUI 321 as a part of user input 314. Based on the combination of user input 314 and the metadata 124, media device 106 or media player 325 can play media content 123 according to the chosen selective content category, such as PG rating. One such example of the first action and the second action performed by media device 106 is shown in the following table.

| Content category (rating) | Selective action (play, mute, no-video, skip, etc.) |
|---|---|
| PG | Play |
| PG-13 | Mute audio stream |
| R | No video, play audio |
| PG | Play |

As shown in the above table, when user 132 provides user input 314 to indicate a preferred content category as PG, when the first portion of media content 123 has a content category PG, media player 325 may play the first portion of media content 123. Afterwards, the second portion of media content 123 has a content category PG-13 that is above the user preferred content category PG, media player 325 may play mute audio stream 353 when playing the second portion of media content 123. Similarly, the third portion of media content 123 has a content category R that is above the user preferred content category PG, media player 325 may play no video but play audio stream 353 when playing the third portion of media content 123. The fourth portion of media content 123 has a content category PG that is the same as the user preferred content category PG, media player 325 may play the fourth portion of media content 123 as normal without any change to the audio stream 353 or vide stream 355.

In some embodiments, media device 106 can receive media content 123 from a content provider, e.g., content server 120, and generate the metadata 124 associated with media content 123 after media content 123 has been received. In some embodiments, media content 123 can have a received metadata including an indication of a third content category for the first portion 135 when media content 123 is received by media device 106, where the third content category is different from the first content category 125, and the first record 341 is generated by modifying the third content category to become the first content category 125 for the first portion 135. Accordingly, media device 106 can have the capability to modify the content category assigned to a portion of media content 123 and provided by content server 120. Such modification may be based on user information 311 or other information.

In some embodiments, there can be many different ways to implement the operations described above. Some or all operations performed by media device 106 can be performed similarly by content server 120, and vice versa. For example, metadata 124 associated with media content 123 can be determined by a cloud server, e.g., content server 120, while the user information 311 can be determined by a user device, e.g., media device 106, and content server 120 can determine the first action and the second action to be performed.

Figure 4:
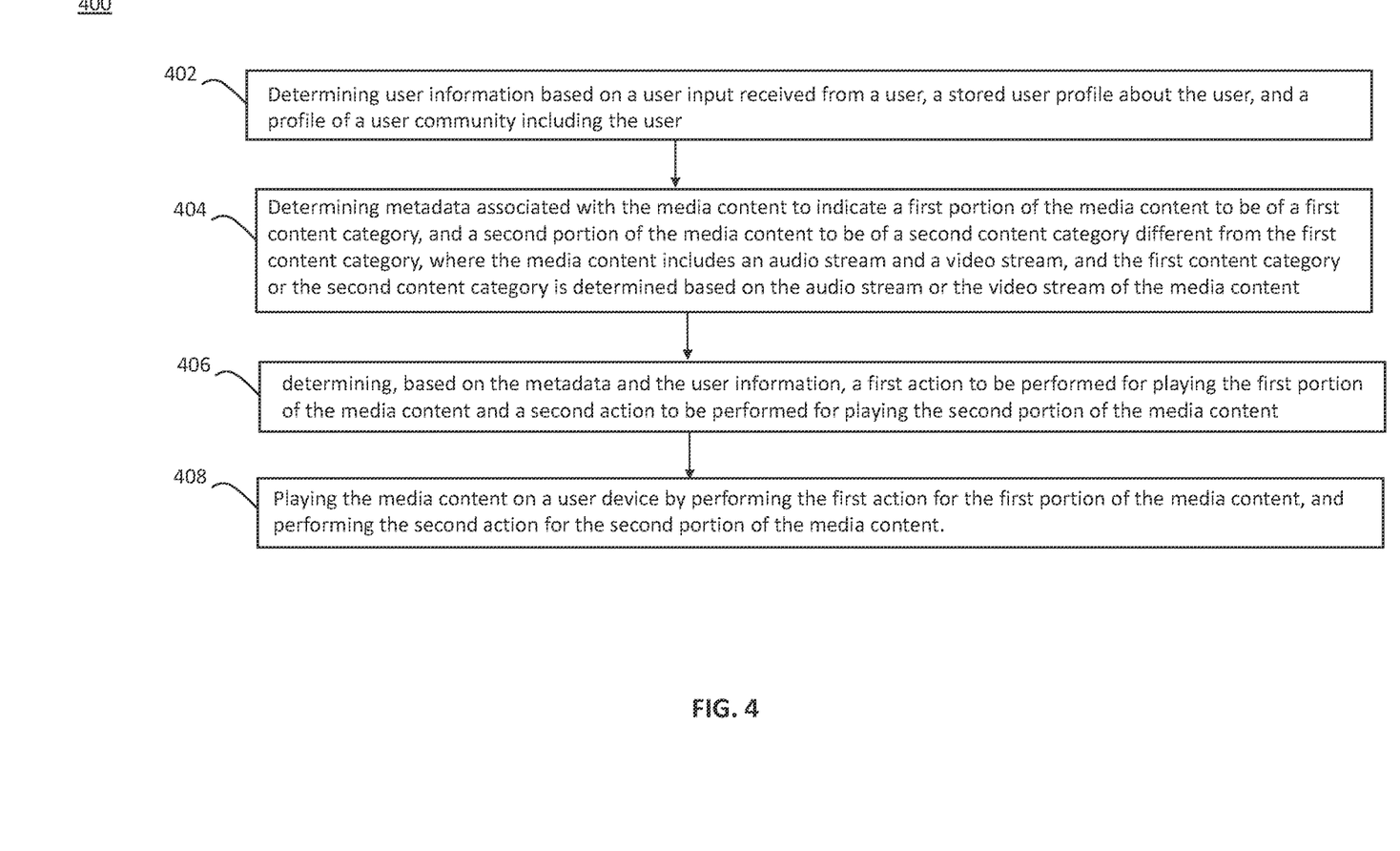
FIG. 4 is a flowchart illustrating an example process for playing media contents based on metadata indicating content categories, according to some embodiments.

FIG. 4 is a flowchart illustrating an example process 400 for playing media contents based on metadata indicating content categories, according to some embodiments. Process 400 can be performed by processing logic that can comprise hardware (e.g., circuitry, dedicated logic, programmable logic, microcode, etc.), software (e.g., instructions executing on a processing device), or a combination thereof. In some embodiments, process 400 may operate across multiple different computing devices simultaneously, or in parallel, thus reducing the amount of time that may be used for operations shown in process 400. It is to be appreciated that not all steps may be needed to perform the disclosure provided herein. Further, some of the steps may be performed simultaneously, or in a different order than shown in FIG. 4, as will be understood by a person of ordinary skill in the art. Process 400 shall be described with reference to FIGS. 1-3. However, process 400 is not limited to that example embodiment.

In some embodiments, at 402, media device 106 can determine user information 311 based on user input 314 received from user 132, user profile 313 about user 132, and profile of a user community 133. In some embodiments, content server 120 can perform some or all of those operations.

In some embodiments, at 404, media device 106 can determine metadata 124 associated with media content 123 to indicate the first portion 135 to be of the first content category 125, and the second portion 137 to be of the second content category 127 different from the first content category 125. Media content 123 includes audio stream 353 and video stream 355, and the first content category 125 or the second content category 127 is determined based on audio stream 353 or video stream 355 of media content 123. In some embodiments, content server 120 can perform some or all of those operations.

In some embodiments, at 406, media device 106 can determine, based on metadata 124 and user information 311, a first action to be performed for playing the first portion 135 of media content 123 and a second action to be performed for playing the second portion 137 of media content 123. In some embodiments, content server 120 can perform some or all of those operations.

In some embodiments, at 408, media device 106 can play media content 123 on a user device by performing the first action for the first portion 135 of media content 123, and performing the second action for the second portion 137 of media content 123. In some embodiments, content server 120 can perform some or all of those operations.

Example Computer System

Figure 5:
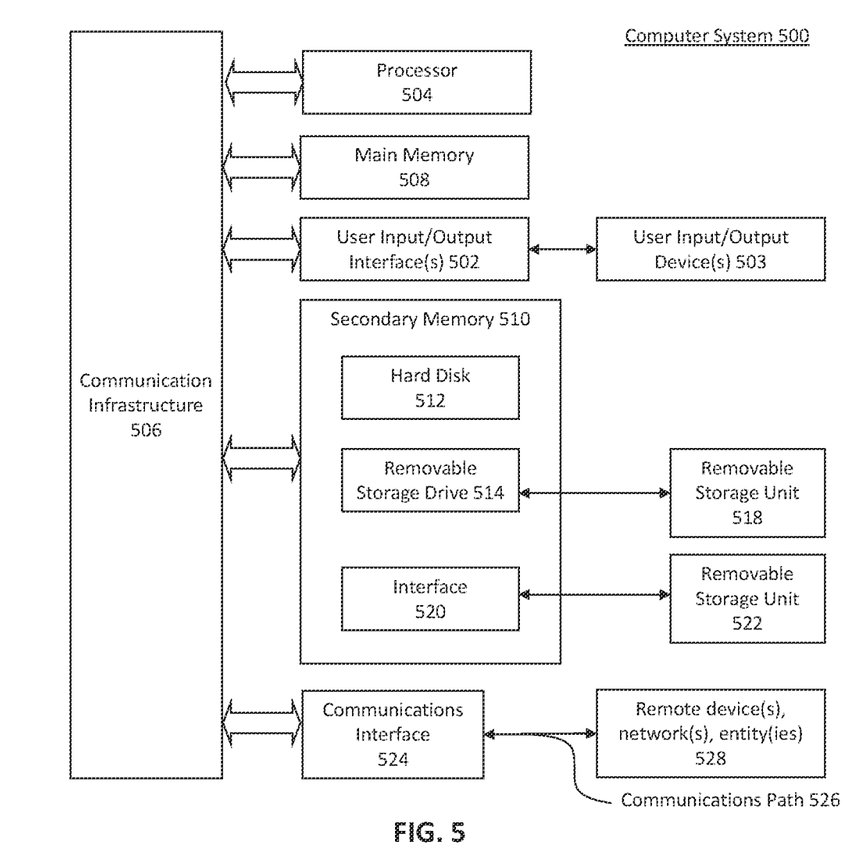
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, may be implemented using combinations or sub-combinations of computer system 500 to perform various functions described herein, e.g., by process 400 performed by media device 106 or content server 120. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.), and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment." or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for playing a media content, comprising:
    determining user information based on a user input received from a user, a stored user profile about the user, and a profile of a user community including the user, wherein the profile of the user community includes data collected about actions performed by other users of the user community that were taken with respect to the media content while being played back to the other users;
    determining metadata associated with the media content to indicate a first portion of the media content to be of a first content category, and a second portion of the media content to be of a second content category different from the first content category, wherein the media content includes an audio stream and a video stream, and the first content category or the second content category is determined based on the audio stream or the video stream of the media content, and wherein the metadata includes information generated by machine learning based on the collected data included in the profile of the user community; and
    determining, based on the metadata, the profile of the user community, and the user information, a first action to be performed for playing the first portion of the media content and a second action to be performed for playing the second portion of the media content, wherein at least one of the first action or the second action comprises altering at least one of the audio stream or the video stream.

2. The method of claim 1, wherein the determining the metadata associated with the media content comprises:
    receiving the media content from a content provider; and
    generating the metadata associated with the media content after the media content has been received.

3. The method of claim 2, wherein the metadata includes a first record having the first content category, and a first time period with a first starting time and a first ending time indicating a duration of the first portion of the media content, and a second record having the second content category, and a second time period with a second starting time and a second ending time indicating a duration of the second portion of the media content.

4. The method of claim 3, wherein the media content has a received metadata including an indication of a third content category when the media content is received, wherein the third content category is different from the first content category, and the first record is generated by modifying the third content category to become the first content category.

5. The method of claim 1, wherein the media content includes a sequence of frames, the first portion of the media content includes a first frame, and the second portion of the media content includes a second frame immediately adjacent to the first frame in the sequence of frames.

6. The method of claim 1, wherein the first content category or the second content category indicates a content rating selected from a general audiences (G) rating, a parental guidance (PG) rating, a PG-13 rating, a restricted (R) rating, or an X rating not suitable for anyone under 17.

7. The method of claim 1, wherein the first content category or the second content category includes an indication related to abusive language in the audio stream, violent language in the audio stream, a sexual scene in the video stream, or a graphic scene in the video stream.

8. The method of claim 1, wherein the user input includes an objected language the user prefers not to hear, and wherein the altering includes removing the objected language from the audio stream when playing the first portion of the media content and removing the objected language from the audio stream when playing the second portion of the media content.

9. The method of claim 1, wherein the user input includes a user preferred content rating, and wherein the altering includes muting the audio stream or playing a blank frame of the video stream when playing the first portion of the media content and the first content category is not compatible with the user preferred content rating.

10. The method of claim 1, wherein the user profile includes data collected about the user based on an action of the user when playing other media content, and the determining the first action and the second action includes determining the first action and the second action based on the metadata and the data collected about the user based on the action of the user when playing the other media content.

11. The method of claim 1, further comprising:
    playing the media content on a user device by performing the first action for the first portion of the media content, and performing the second action for the second portion of the media content.

12. The method of claim 11, wherein the performing the first action for the first portion of the media content includes playing the video stream without playing at least a part of the audio stream, or playing the audio stream without playing at least a part of the video stream.

13. The method of claim 1, wherein:
    the determining the metadata associated with the media content includes determining the metadata associated with the media content by a cloud server;
    the determining the user information includes determining the user information based on the user input received from the user by a user device; and
    the determining the first action and the second action includes determining the first action and the second action by the cloud server.

14. A computing device, comprising:
    a memory configured to store a user input received from a user and a user profile about the user; and
    at least one processor coupled to the memory and configured to:
        determine user information based on the user input, the user profile about the user, and a profile of a user community including the user, wherein the profile of the user community includes data collected about actions performed by other users of the user community that were taken with respect to a media content while being played back to the other users;

determine metadata associated with the media content to indicate a first portion of the media content to be of a first content category, and a second portion of the media content to be of a second content category different from the first content category, wherein the media content includes an audio stream and a video stream, and the first content category or the second content category is determined based on the audio stream or the video stream of the media content, and wherein the metadata includes information generated by machine learning based on the collected data included in the profile of the user community; and determine, based on the metadata, the profile of the user community, and the user information, a first action to be performed for playing the first portion of the media content and a second action to be performed for playing the second portion of the media content, wherein at least one of the first action or the second action comprises altering at least one of the audio stream or the video stream.

15. The computing device of claim 14, wherein to determine the metadata associated with the media content, the at least one processor is configured to:

receive the media content from a content provider; and
generate the metadata associated with the media content after the media content has been received.

16. The computing device of claim 15, wherein the metadata includes a first record having the first content category, and a first time period with a first starting time and a first ending time indicating a duration of the first portion of the media content, and a second record having the second content category, and a second time period with a second starting time and a second ending time indicating a duration of the second portion of the media content.

17. The computing device of claim 16, wherein the media content has a received metadata including an indication of a third content category when the media content is received, wherein the third content category is different from the first content category, and the first record is generated by modifying the third content category to become the first content category.

18. The computing device of claim 14, wherein the media content includes a sequence of frames, the first portion of the media content includes a first frame, and the second portion of the media content includes a second frame immediately adjacent to the first frame in the sequence of frames.

19. A non-transitory computer-readable medium having instructions stored thereon that, when executed by at least a computing device, cause the computing device to perform operations comprising:

determining user information based on a user input received from a user, a stored user profile about the user, and a profile of a user community including the user, wherein the profile of the user community includes data collected about actions performed by other users of the user community that were taken with respect to a media content while being played back to the other users;

determining metadata associated with the media content to indicate a first portion of the media content to be of a first content category, and a second portion of the media content to be of a second content category different from the first content category, wherein the media content includes an audio stream and a video stream, and the first content category or the second content category is determined based on the audio stream or the video stream of the media content, and wherein the metadata includes information generated by machine learning based on the collected data included in the profile of the user community; and determining, based on the metadata, the profile of the user community, and the user information, a first action to be performed for playing the first portion of the media content and a second action to be performed for playing the second portion of the media content, wherein at least one of the first action or the second action comprises altering at least one of the audio stream or the video stream.

20. The non-transitory computer-readable medium of claim 19, wherein the determining the metadata associated with the media content comprises:

receiving the media content from a content provider; and
generating the metadata associated with the media content after the media content has been received,
wherein the metadata includes a first record having the first content category, and a first time period with a first starting time and a first ending time indicating a duration of the first portion of the media content, and a second record having the second content category, and a second time period with a second starting time and a second ending time indicating a duration of the second portion of the media content; and
wherein the media content has a received metadata including an indication of a third content category when the media content is received, wherein the third content category is different from the first content category, and the first record is generated by modifying the third content category to become the first content category.

* * * * *